US007412822B2

(12) United States Patent
Zhan et al.

(10) Patent No.: US 7,412,822 B2
(45) Date of Patent: Aug. 19, 2008

(54) REGENERATION CONTROL FOR DIESEL PARTICULATE FILTER FOR TREATING DIESEL ENGINE EXHAUST

(75) Inventors: Rijing Zhan, San Antonio, TX (US); Yiqun Huang, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 69 days.

(21) Appl. No.: 11/343,257

(22) Filed: Jan. 27, 2006

(65) Prior Publication Data

US 2006/0179821 A1 Aug. 17, 2006

Related U.S. Application Data

(60) Provisional application No. 60/647,515, filed on Jan. 27, 2005.

(51) Int. Cl.
*F01N 3/00* (2006.01)

(52) U.S. Cl. ............................ 60/295; 60/274; 60/286; 60/297; 60/303; 60/311

(58) Field of Classification Search .................. 60/274, 60/286, 295, 297, 303, 311
See application file for complete search history.

(56) References Cited

U.S. PATENT DOCUMENTS 6,634,170 B2 10/2003 Hiranuma et al. ............. 60/295
6,666,019 B2 12/2003 Kawatani et al. .............. 60/286
6,718,757 B2 4/2004 Khair et al. .................... 60/286
6,725,653 B2 * 4/2004 Brown et al. .................. 60/297
6,756,904 B2 6/2004 Kinugawa et al. ........... 340/606
6,851,258 B2 * 2/2005 Kawashima et al. .......... 60/311
7,013,638 B2 * 3/2006 Hiranuma et al. ............ 60/286
7,076,944 B2 * 7/2006 Okugawa et al. ............. 60/295
2002/0078684 A1 6/2002 Carberry et al. ............... 60/295
2003/0033800 A1 2/2003 Tonetti et al. ................ 60/286
2003/0221423 A1 12/2003 Kosaka et al. ................. 60/297
2004/0112046 A1 6/2004 Tumati et al. ................. 60/297
2004/0123586 A1 7/2004 Kuboshima et al. ........... 60/277
2004/0128987 A1 7/2004 Kuboshima et al. ........... 60/295
2004/0139738 A1 7/2004 Kuboshima et al. ........... 60/288

OTHER PUBLICATIONS

International Search Report and Written Opinion, PCT/US06/03151, 10 pages, Oct. 4, 2007.

International Preliminary Report on Patentability, PCT/US2006/003151, 7 pgs., Nov. 1, 2007.

* cited by examiner

*Primary Examiner*—Thomas Denion
*Assistant Examiner*—Diem Tran
(74) *Attorney, Agent, or Firm*—Baker Botts LLP

(57) ABSTRACT

A method and system for controlling exhaust gas temperature at a diesel particulate filter during regeneration. The temperature rise is controlled at a rate that will prevent harm to the filter caused by high temperatures and rapid increases.

12 Claims, 1 Drawing Sheet

REGENERATION CONTROL FOR DIESEL PARTICULATE FILTER FOR TREATING DIESEL ENGINE EXHAUST

CROSS-REFERENCE TO RELATED APPLICATIONS

This application claims the benefit of U.S. Provisional Application No. 60/647,515 filed on Jan. 27, 2005, entitled "Regeneration Control for Diesel Particulate Filter for Treating Diesel Engine Exhaust", which is incorporated herein by reference in its entirety.

TECHNICAL FIELD OF THE INVENTION

This invention relates to emissions treatment devices for internal combustion engines, and more particularly to an improved diesel particulate filter (DPF) regeneration method and related engine control strategy.

BACKGROUND OF THE INVENTION

Internal combustion engines are a major contributor to harmful emissions. Internal combustion engines dominate land transportation propulsion—cars, trucks, off-highway vehicles, railroad, marine, motorcycles——as well as provide mechanical and electrical power for a wide range of large and small applications. The two dominant types of internal combustion engines are spark-ignition and diesel. The amount and composition of the emissions exhausted from these engines depend on the details of the processes that occur within the engine during operation, the characteristics of the fuel used, and the type of emissions control system used.

For diesel engines, the main pollutants of concern are nitrogen oxides (NOx) and particulate matter (PM). The latter is composed of black smoke (soot), sulfates generated by the sulfur in fuel, and organic components of unburned fuel and lubricating oil.

To reduce particulate emissions, one approach is the use of diesel particulate filters (DPFs). A DPF is used downstream of the engine, in the exhaust line, and works in repeated loading and regeneration cycles. During the loading stage, the DPF filters the exhaust gas, such that PM in the exhaust is trapped inside the DPF channels while gaseous components in the exhaust pass through. During the regeneration stage, captured PM is burned off inside the DPF.

Various parameters enhance the regeneration quality of DPFs. Both exhaust gas temperature and oxygen content contribute to increased regeneration activity. Thus, regeneration occurs with the presence of oxygen, which always available in the exhaust because diesel engines operate under lean-burn conditions. Elevated temperature is provided by a burner or heater. Often, an oxidation catalyst is provided upstream of the DPF to further assist in regeneration.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Emissions Control System Overview (Single Path)

Figure 1:
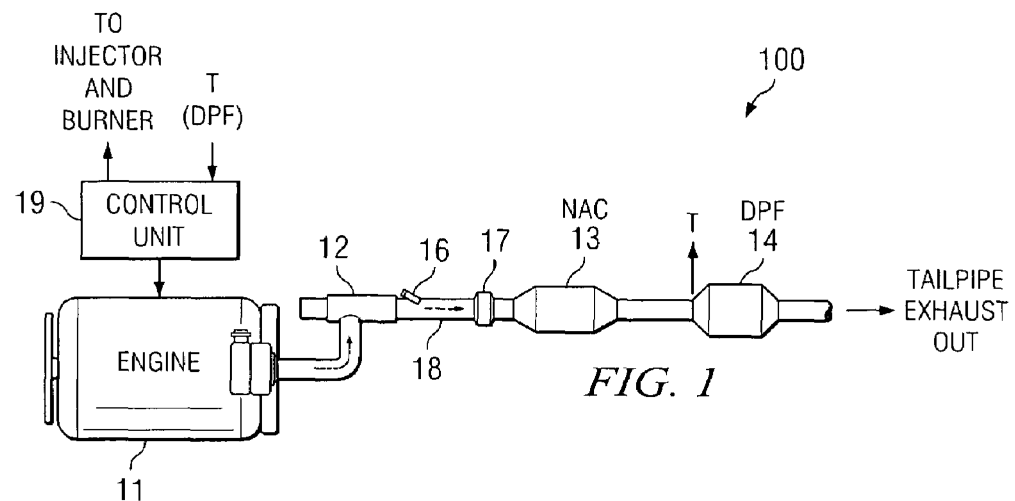
FIG. 1 illustrates a diesel emissions system, having DPF regeneration control in accordance with the invention.

FIG. 1 illustrates an emissions system 100 for a diesel engine 11, having a DPF 14 whose regeneration is controlled in accordance with the invention. In the example of this description, system 100 is for vehicle engines, but the same concepts could be applied to stationary engines.

In the example of this description, system 100 has both a NOx adsorber catalyst (NAC) 13 and a diesel particulate filter (DPF) 14. However, in other embodiments, the DPF 14 may be used alone or may be accompanied by one or more emissions control devices in addition to or other than a NAC.

System 100 is a "post combustion" emissions system, in that it is located downstream of engine 11 and treats exhaust from engine 11. System 100 is a single path system, as compared to the dual path system described below in connection with FIG. 3.

NAC 13 is downstream of engine 11, followed by DPF 14. Both NAC 13 and DPF 14 may be implemented with devices known or to be developed in the art of engine emissions control. Devices for implementing NAC 13 are also known as lean NOx traps (LNTs).

NAC 13 has three operational stages. The first is a precious metal oxidation catalyst that is responsible for converting nitric oxide (NO) to nitrogen dioxide (NO2). The second stage is a base metal oxide NO2 trap that requires periodic regeneration by enriching the exhaust flow to the NAC 13. Even when not regenerating, this stage requires a certain temperature to be maintained for proper operation. The third stage reduces NO2 released during regeneration to N2 and H2O under proper exhaust conditions.

The efficiency of NAC 13 is a function of exhaust gas temperature among other parameters. For a typical diesel engine 11, if a mid-to-high percent conversion of NOx is desired, a NAC using today's technology should operate in a range of 250-375 degrees centigrade. However, for a typical "light load" vehicle engine 11, the average operating temperature may be below that range.

NAC 13 requires regeneration when its NOx levels reach a certain extent. Typically, this may occur as frequently as every 60-100 seconds with a regeneration period of less than 10 seconds. Generally, NAC regeneration is accomplished by changing the composition of the exhaust. One approach to regeneration involves reducing the oxygen in the diesel exhaust stream entering NAC 13, such that the exhaust is rich. A reducing agent may also be added. As discussed below, burner 12, fuel injector 16, and oxidation catalyst 17 are upstream of both NAC 13 and DPF 14 and may be used to enhance the operation of either or both.

DPF 14 traps particulate mass emission in the exhaust. There are several aliases for DFP's, such as soot filter, diesel filter, etc. Typically, a DPF substrate without a catalyst is simply called a DPF. A catalyzed DPF (CDPF) has a catalyst on its substrate surface. There are various commercially available devices marketed in the "DPF" category, such as continuously regenerated traps (CRTs), catalyzed continuously regenerated traps (CCRTs), and others. "DPF" is used herein to mean any device for controlling soot and/or particulate matter, both collectively referred to herein as "PM".

As stated in the Background, DPF 14 works in repeated loading and regeneration cycles. During the loading stage, DPF 14 filters PM from the exhaust gas. PM is trapped inside the DPF channels while the gaseous components in the exhaust pass through.

To ensure that DPF 14 remains efficient and does not fill up with soot, it is necessary to monitor the differential pressure across DPF 14 and to force regeneration when necessary. PM accumulation in DPF 14 causes an increase in the pressure drop (DPF-ΔP) across DPF 14, which decreases DPF effectiveness and deteriorates engine fuel economy. Therefore, DPF 14 must be regenerated when the PM loading reaches a certain level.

During DPF regeneration, captured PM is burned off inside the DPF 14 with the presence of oxygen under elevated exhaust gas temperatures, with or without a diesel oxidation catalyst (DOC) 17 upstream of DPF 14. In other cases, a different catalyst is used to convert NO in the diesel exhaust stream into NO2, and the NO2 is used to react with PM for DPF regeneration.

For NAC or DPF regeneration, a supplemental fuel injector 16, upstream of catalyst 17, enhances the available reductant (for NAC regeneration) and accelerates the transition of the exhaust gas from lean to rich conditions. The post-combustion fuel injection could be in-exhaust by supplemental fuel injector 16, or it could be in-cylinder.

During DPF regeneration, as PM is burned off, DPF-ΔP decreases until DPF 14 is fully regenerated. In an ideal situation, the regenerated DPF 14 should have the same DPF-ΔP as when it was fresh under the same engine operating conditions.

For a typical emissions system 100, the frequency of regeneration for DPF 14 may be every few days to a month with a regeneration period of 15 to 30 minutes. DPF regeneration may require a temperature at DPF 14 as high as 600 degrees centigrade.

Burner 12 may be used for supplemental heat generation, drawing from the fuel source of engine 11 or some other fuel source. Burner 12 can be located in close proximity to the emissions system 100, thereby reducing heat loss between the point of heat generation and heat transfer to the emission system 100.

Specifically, burner 12 maintains a desired temperature of the exhaust gas. For NAC 13, burner 12 helps maintain a desired temperature during both normal operation and regeneration. For DPF regeneration, heat output from burner 12 is expected to provide exotherms sufficiently high for regeneration of both catalyst-based and non-catalyst-based DPFs.

Burner 12 may be used without or without oxidation catalyst 17. If a burner is used, heat can be controlled by controlling the burner fuel rate, regardless of whether that fuel is provided directly to the burner, or upstream of an oxidation catalyst by injector 16 as in FIG. 1.

Thus, as indicated above, there are various approaches to providing elevated temperature of the exhaust gas in DPF 14 during DPF regeneration. The heat control method described herein may be used with any of these heating systems. For example, the heat control method may be applied when supplemental fuel is used with an oxidation catalyst, or with a burner, or with a combination of catalyst and burner. Also, the heat control method can be used when elevated heat is provided by an electric heater, as illustrated below in connection with FIG. 3.

As explained below in connection with FIG. 2, control unit 19 controls the rate of heat provided for DPF regeneration. Depending on the manner in which heat is provided, it may control the rate of supplemental fuel, whether in-cylinder, or post-injection, and whether to a burner or oxidation catalyst or both. Appropriate control connections would be implemented. If an electric heater is used, control unit 19 communicates with the heater to control heater output.

Control unit 19 may be processor-based, programmed to control heat during DPF regeneration in accordance with the methods described herein. Although not illustrated, feedback control methods, using a heat sensor at DPF 14 and temperature measurements delivered to control unit 19, may be implemented. In general, control unit 19 may be implemented with various controller devices known or to be developed. Further, control unit 19 may be integrated into an engine control unit (not shown) that controls various other engine and/or emissions devices.

Temperature Control for DPF Regeneration

Figure 2:
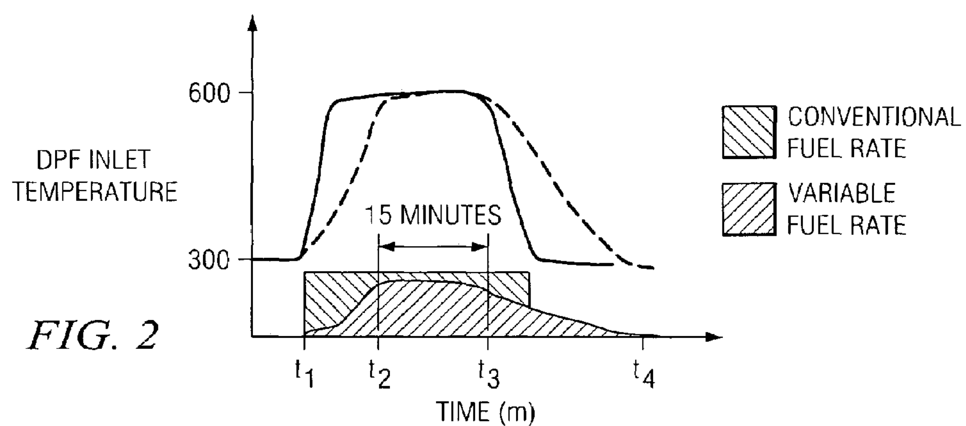
FIG. 2 illustrates exhaust gas temperature control during DPF regeneration, for the system of FIG. 1.

FIG. 2 illustrates the temperature profile and fuel rate profile for DPF regeneration control in accordance with the invention. For comparison, conventional temperature and fuel rate profiles are also illustrated.

For purposes of example, the typical regeneration temperatures and periods discussed above are illustrated. Thus, the following parameters are assumed: a "normal" diesel operating temperature of 300 degrees C., a regeneration temperature of 600 degrees C., and a regeneration period from 15 to 30 minutes. Thus, regeneration occurs with a temperature rise from about 300 degrees to about 600 degrees C.

The high regeneration temperature is maintained from time t2 to t3 (referred to herein as the "regeneration period"). The beginning and end of the temperature increase are t1 and t4, respectively. The time between t1 and t4 is referred to herein as the temperature profile period, and is about twice as long as the actual high temperature regeneration period.

For regeneration control in accordance with the invention, the fuel rate for temperature control is variable. As explained above, in the example of this description, this fuel is supplied post-injection by injector 16. Various supplementary fuel injectors can be used for DFP regeneration purposes. If the regeneration fuel is supplied through the engine fuel injection system and controlled by the engine ECU, this regeneration fuel injection is typically called post-injection, or PI. By comparison, for conventional DPF regeneration, the fuel rate is fixed.

The temperature profile illustrates temperature measured at the inlet of DPF 14. Temperature begins to increase when fuel injection for DPF regeneration begins. The temperature increase rate is slower than for conventional DPF regeneration. Temperature decease after DPF regeneration is also slower than for conventional DPF regeneration. Both temperature increase and decrease occur during substantially the same time period as fuel increase and decrease.

In the example of FIG. 2, the temperature and fuel increases occur over a time period that is about half as long as the regeneration period, with a ratio of about 1:2. The temperature and fuel decreases occur over a time period that has about a 1:1 ratio in relation to the regeneration period.

Within the range of typical regeneration periods (t2 to t3=15 to 30 minutes), the associated temperature increase and decrease rates can be easily recalculated. For example, for a regeneration period of 15 minutes, the temperature increase and decrease would occur over about 7 and 15 minutes respectively, and the temperature increase and decrease rates would be about 40 degrees per minute and 20 degrees per minute, respectively. For a regeneration period of 30 minutes, the temperature increase and decrease occur over about 15 and 30 minutes, respectively, and the increase and decrease rates would be about 20 degrees per minute and 10 degrees per minute, respectively.

For engines with lower "normal" temperatures, these rates could be somewhat lower. For example, if the normal operating temperature were 200 degrees C., the temperature increase rate for a 15 minute regeneration period would be about 53 degrees per minute. The temperature decrease rate would be about 27 degrees per minute.

It is also expected that improvement in DPF catalyst materials and design may permit temperature increase rates to become higher. To this end, a feature of the invention is that, for a particular DPF, an "optimum" temperature increase rate can be determined by determining the fastest rate at which the temperature can be raised without causing undue thermal stress to the catalyst. This results in an optimal balance between the goal of minimizing regeneration time and preventing damage to the DPF.

The regeneration fuel rate (PI if fuel is delivered through the engine fuel injection system controlled by ECU) may be varied on either time-based or cycle-based strategies. As an example of a cycle-based increase, a fuel injection rate could be increased to a 0.65 fuel injector duty cycle in five steps: 0.15, 0.3, 0.45, 0.55, and 0.65.

The regeneration fuel rate can either be programmed into engine ECU as part of the integrated diesel after treatment system. Alternatively, an ECU-independent control unit may be to deliver the DPF regeneration fuel through a fuel injection or delivery system other than the engine fuel injection system.

The slower temperature changes at the beginning and end of regeneration protect the DPF substrate and catalyst washcoat (if any) from thermal shock caused by abrupt DPF temperature changes. The controlled temperature changes also achieve lower fuel consumption.

Dual Path Emissions Control System

Figure 3:
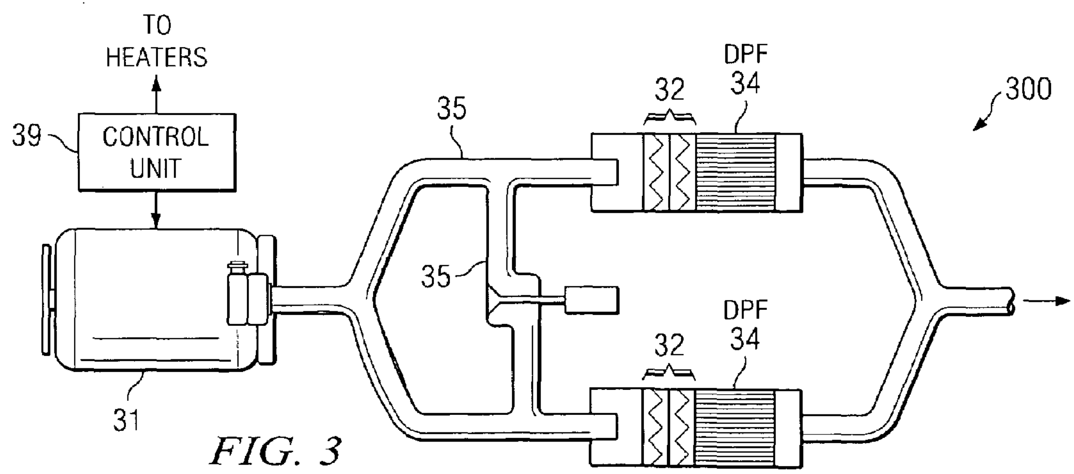
FIG. 3 illustrates a dual path emission system having DPF regeneration control in accordance with the invention.

FIG. 3 illustrates an alternative emissions system design, such that emissions system 300 has a dual-path. Here, each path has a DPF 34 and an electric heater 32. In other embodiments, each path could have one or more additional emissions control devices, such as in FIG. 1 or the various embodiments discussed in connection with FIG. 1.

The basic concept of the dual-path design of FIG. 3 is that one DPF 34 can be used for filtering PM while the other is regenerating. By alternating between two DPFs 34, PM can be continuously collected.

Exhaust from engine 11 is alternated between the DPFs 34, using valves 35. Each DPF 34 is preceded by a heater 32, which is activated during regeneration in accordance with the invention. Valves 35 control the exhaust flow to the two paths.

Control unit 39 is programmed or otherwise designed to control the temperature by controlling the heat provided by heaters 32, using the temperature control techniques described above. Control unit 39 may have the same features as control unit 19. As described above in connection with control unit 19, control unit 39 may be implemented with a processor-based device, and may be integrated with an engine control unit that serves various other control functions.

What is claimed is:

1. A method of regenerating a diesel particulate filter (DPF) in the exhaust line of a diesel engine, comprising:

increasing the temperature at the DPF from an operating temperature to a regeneration temperature;

wherein the increasing step is performed at least in part by injecting supplemental fuel upstream the DPF, using a variable fuel injection rate;

controlling the rate of the increasing step such that temperature increases occur substantially linearly during an optimal temperature increase period;

maintaining the regeneration temperature during a regeneration period;

decreasing the temperature at the DPF back to the operating temperature;

wherein the increasing, maintaining, and decreasing steps are performed during a temperature profile period in which the duration of the increasing step has at least a 1:2 ratio with the duration of the regeneration period and the duration of the decreasing step has at least a 1:1 ratio with the duration of the regeneration period.

2. The method of claim 1, wherein the optimal temperature increase period is determined by determining the fastest rate at which temperature can be increased without substantial thermal stress to the DPF.

3. The method of claim 1, wherein the increasing step is performed such that temperature increases occur over an increase period of at least seven minutes.

4. The method of claim 1, wherein the increasing and injecting steps begin at substantially the same time and occur during the same time period.

5. The method of claim 1, wherein the increasing step is performed such that temperature increases at a rate not exceeding 53 degrees per minute.

6. The method of claim 1, further comprising the step of decreasing the temperature at the DFP after the regeneration period, wherein the temperature decrease occurs at a rate not exceeding 27 degrees per minute.

7. The method of claim 1, wherein the injecting step is achieved with post-injection fuel injection.

8. The method of claim 1, wherein the injecting step is achieved by injecting supplemental fuel into the exhaust line.

9. The method of claim 1, further comprising the step of using a time measuring device to determine time elapsed since a prior regeneration, and wherein the increasing and injecting steps occur in response to such measurement.

10. The method of claim 1, further comprising the step of using a pressure measuring device to measure differential pressure across the DPF, and wherein the increasing and injecting steps occur in response to such measurement.

11. The method of claim 1, wherein the fuel injection rate is cycle-based.

12. The method of claim 1, wherein the fuel injection rate is time-based.

* * * * *